March 28, 1944.   R. A. GOEPFRICH   2,345,107
BRAKE
Filed Nov. 24, 1939    2 Sheets-Sheet 1

INVENTOR.
RUDOLPH A. GOEPFRICH
BY
ATTORNEY.

March 28, 1944.  R. A. GOEPFRICH  2,345,107
BRAKE
Filed Nov. 24, 1939  2 Sheets-Sheet 2
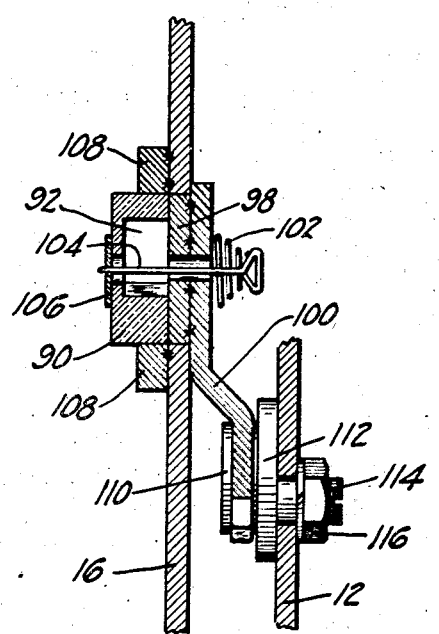
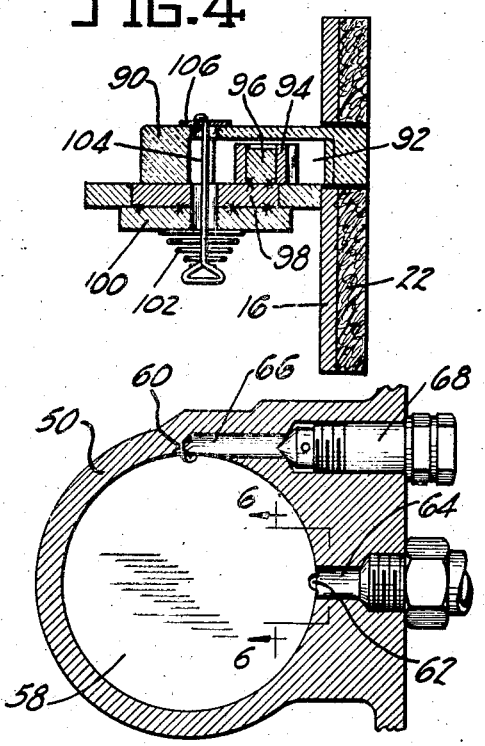
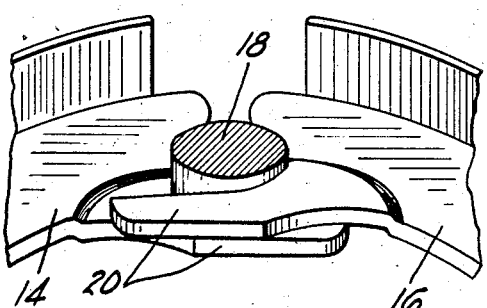
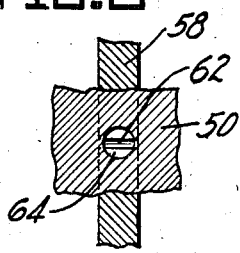
INVENTOR.
RUDOLPH A. GOEPFRICH
BY
ATTORNEY.

Patented Mar. 28, 1944

2,345,107

UNITED STATES PATENT OFFICE 2,345,107

BRAKE

Rudolph A. Goepfrich, South Bend, Ind., assignor to Bendix Aviation Corporation, South Bend, Ind., a corporation of Delaware Application November 24, 1939, Serial No. 305,844

3 Claims. (Cl. 188—152)

This invention relates to brakes, and is illustrated as embodied in an internal expanding automobile brake of the shiftable-anchorage type.

An object of the invention is to provide a brake of this character with simple means for preserving the shoe clearance substantially constant as the brake lining wears. In the preferred adjustment means, a part which engages the brake drum when the brake is applied is utilized to measure the lining wear, so that variations in drum diameter due to changes in temperature will not affect the accuracy of the adjustment.

Another object is to provide means for cushioning the shock when the brake shoes shift from one anchorage to the other as in reverse braking. This is especially advantageous in combination with the above-mentioned automatic adjustment means, particularly when the adjustment is accomplished by devices such as stops set by the drum-engaging parts in such a manner that the primary shoe is set (in released position) further and further from the anchor as the lining wears. This released position of the primary shoe away from the anchor would cause distinct shocks as the shoe shifts back against the anchor in reverse braking, if it were not for the cushioning action.

Preferably the cushioning is accomplished by a baffle or the like in the wheel cylinder which serves as the brake-applying means when the service brake pedal is operated.

Other objects and features of the invention, including various novel combinations and arrangements of the parts, and desirable particular mechanical constructions, will be apparent from the following description of the illustrative embodiments shown in the accompanying drawings, in which:

Figure 3 is a partial section on the line 3—3 of Figure 1;

Figure 4 is a partial section on the line 4—4 of Figure 3;

Figure 5 is a partial section on the line 5—5 of Figure 1;

Figure 6 is a partial section on the line 6—6 of Figure 5; and

Figure 7 is a detail perspective view showing the engagement of the shoes with the anchor post.

Figure 1:
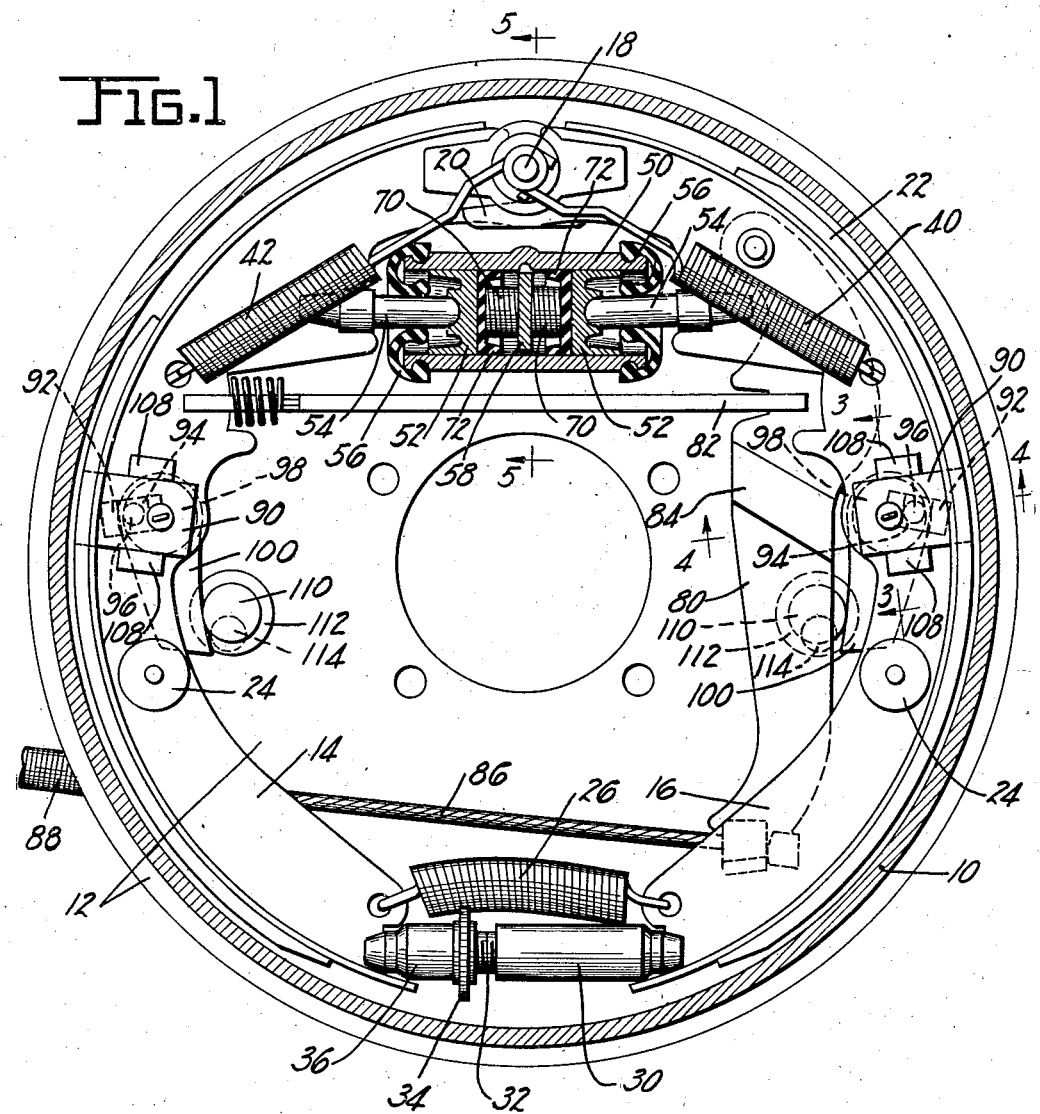
Figure 1 is a section through one of the rear brakes, in a plane just inside the head of the brake drum, showing the brake shoes in side elevation.
Figure 2:
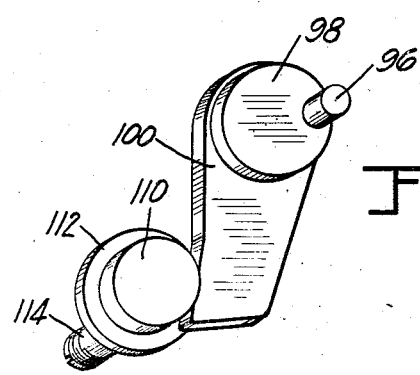
Figure 2 is a detail perspective view of the fixed part and of the eccentric-actuated lever forming part of one of the automatically-adjusted stops.

The illustrated brake includes a rotatable drum 10, at the open side of which is a suitable support such as a backing plate 12, and within which is arranged the brake friction means which preferably comprises a primary shoe 14 and a secondary shoe 16. In forward braking the secondary shoe 16 has an anchorage against one side of an anchor post 18 carried by the backing plate; in reverse braking the primary shoe 14 has an anchorage against the other side of the post 18. The shoes are T-shaped in cross section and have at their ends over-lapping offset projections or tongues 20 extending from their webs and engaging the inner side of the post 18, to position the anchored ends of the shoes radially of the brake. The shoes are faced with suitable lining 22, and may if desired have the usual steady rests 24.

The lower ends of the shoes are connected by suitable articulating means such as a thrust strut against which the shoe webs are held by a spring 26. If it is desired to provide an initial or factory adjustment for the primary shoe, this strut may be made adjustable, for example, including an internally threaded sleeve 30 notched at its end to engage the notched end of the web of shoe 16, and receiving the threaded end of an adjusting screw 32 having a serrated flange 34 yieldingly locked by the spring 26. The adjusting member 32 has opposite its threaded end a smooth projection received in a socket 36 which is notched at its end to embrace the notched end of the web of shoe 14.

Since most braking is done when the car is moving forward, it is desirable that the secondary shoe 16 should not leave the anchor 18 during the application of the brake, and should remain anchored while the brake is applied. To this end the brake is provided with a relatively heavy return spring 40 tensioned between the reduced end of the anchor post 18, and the web of secondary shoe 16, at such an angle as to hold the shoe yieldingly in a position determined by the automatically-adjusted stop described below and by engagement of a cylindrical socket formed in the end of the shoe web with one side of the anchor post 18. The tongue 20 is not essentially on the shoe 16, but is provided so that shoes 14 and 16 may be identical and interchangeable.

A lighter return spring 42 is tensioned between the anchor post 18 and the primary shoe 14 in a similar manner. In this case the released position of the shoe is determined by the action of this spring in holding the shoe against the socket 36 and in a position determined by the automatic stop described below, with tongue 20 riding against the bottom of the anchor post 18 to determine the vertical position of the shoe.

The illustrated applying means for the brake includes a wheel-brake cylinder 50 mounted on the backing plate, and containing pistons 52 connected to the respective shoe ends by piston rods 54 notched to embrace notched portions of the shoe webs. The ends of the cylinder may be protected by suitable rubber boots 56.

According to an important feature of the invention, of special utility when used as shown in combination with the automatic adjusting means described below, the wheel-brake cylinder is provided with means adapting it to serve as a hydraulic check or dashpot, cushioning the movement of the primary shoe 14 back against the anchor 18 in reverse braking.

To this end the wheel cylinder is provided centrally with a baffle or partition 58, secured fixedly in the cylinder between the pistons 52, and past which the liquid in the cylinder can flow slowly when necessary through small grooves or restricted passages 60 and 62 (Figure 5). The cylinder inlet 64 communicates with the groove 62, and the bleeder passage 66 communicates with the groove 60. The usual bleeder screw 68 normally closes the bleeder passage 66.

The cylinder inlet 64 communicates with a master cylinder (not shown) operated by the service brake pedal, the master cylinder being of the usual type which maintains a small pressure in the lines even when the brake is released. This pressure maintains the pistons 52 pressed outwardly so that piston rods 54 at all times engage the shoes, regardless of the setting of the brake-adjusting means.

Springs 70 are compressed between the partition 58 and rubber sealing cups 72 facing the pistons 52, and maintain the sealing cups in place.

In addition to the hydraulic applying means just described, the rear brakes are preferably provided with mechanical applying means connected to the emergency brake lever or its equivalent. As shown, this consists of a lever 80 pivoted at its upper end to the shoe 16 and acting on the shoe 14 through a thrust link 82.

The lever 80 moves in the space between the backing plate 12 and the web of shoe 16, and has a part 84 offset to clear the automatically adjusted stop hereinafter described. The lower end of lever 80 is connected to a cable 86 which passes out through an opening in the backing plate and which forms the tension element of the usual Bowden-type control 88.

Blocks 90, of ceramic or other slow-wearing non-scoring hard material, are frictionally clamped against the drum sides of the shoe webs, and extend outwardly through openings in the shoe rims and in the brake lining 22, with their outer ends flush with the face of the lining. As the lining wears, these blocks are shifted by engagement with the drum, during brake applications, inwardly transversely of the shoe webs.

Each block 90 is formed with an inclined cam slot 92 receiving a square cam follower or block 94 sleeved on an eccentric pin or post 96. The eccentric pin 96 is integral with or secured to a circular member 98 pivotally received in a circular opening in the shoe web. The circular member 98 is integral with, or welded or otherwise secured fixedly to, a lever 100 which extends along the shoe web and which is large enough to cover the opening in which the member 98 is pivoted, and thereby keep the member 98 in place.

A spring 102 is compressed between each lever 100 and a head formed on a wire link 104, which passes through relatively large alined openings in lever 100 and member 98 and block 90, and the other end of which is turned laterally to seat against a washer 106 engaging the outer face of block 90.

The block 90 is slidably guided between lugs 108 projecting from the shoe web, and by the openings in the shoe rim and in the lining through which it passes, and the block 90 and lever 100 are yieldingly clamped frictionally against opposite sides of the shoe web in any position to which they are shifted by the rubbing pressure of the drum against the end of the block 90.

When the brake is released, the levers 100 of the stop devices engage rollers 110 carried by eccentric adjustable parts 112 having stems 114 clamped in the backing plate by nuts 116.

In operation, the brake is actuated in the usual manner by forcing liquid into the cylinder 50. Spring 40 holds the secondary shoe 16 continuously anchored in forward braking. Shoe 14 is forced against the drum, and in turn forces shoe 16 against the drum, the braking torque for both shoes being transmitted to the anchor 18 through the shoe 16.

In reverse braking, as soon as the shoes 14 and 16 engage the drum, the wiping friction of the drum on the shoes overcomes the spring 40 and the secondary shoe 16 temporarily leaves the anchor and acts as an actuating or primary shoe, while shoe 14 becomes temporarily the anchored or secondary shoe, and shifts back against the anchor 18, the shock being cushioned by the dashpot action of the liquid being forced through the restricted passages 60 and 62.

As the brake wears, the blocks 90 are forced inwardly by the drum, shifting the levers 100 to positions compensating for the wear. This causes the toe end of shoe 14 gradually to shift away from the anchor 18 in released position, the static pressure in cylinder 50 causing the corresponding piston 52 to follow it out and thereby to increase the volume of liquid in the system to compensate for the adjusted shoe position.

The static pressure in the cylinder 50 also insures a proper cushioning or dashpot action when the brake is applied mechanically by rocking lever 80 through the emergency brake connections.

While one illustrative embodiment has been described in detail, it is not my intention to limit the scope of the invention to that particular embodiment, or otherwise than by the terms of the appended claims.

I claim:

1. A brake comprising a drum, primary and secondary shoes, an anchor between the shoes at one side of the drum, articulating means connecting the shoes at the other side of the drum, an adjustable stop associated with each shoe and having a part engaging the drum when the brake is applied and which sets the stop to compensate for wear of the shoe, a strong spring yieldingly holding the secondary shoe against the anchor in a position determined by its stop, a weaker spring urging the primary shoe toward the anchor into a position determined by its stop, and a hydraulic applying device acting on the shoes at their anchored ends and provided with means forming a hydraulic check cushioning the movement of the primary shoe against the anchor in reverse braking, said primary shoe having a part engaging the inner face of the anchor and positioning that end of the primary shoe radially of the drum.

2. A brake comprising a drum, primary and secondary shoes, an anchor between the shoes at one side of the drum, articulating means connecting the shoes at the other side of the drum, an adjustable stop associated with each shoe and having a part engaging the drum when the brake is applied and which sets the stop to compensate for wear of the shoe, a strong spring yieldingly holding the secondary shoe against the anchor in a position determined by its stop, a weaker spring urging the primary shoe toward the anchor into a position determined by its stop, a mechanical device for forcing the shoes apart to apply the brake, and a device cushioning the movement of the primary shoe against the anchor in reverse braking, said mechanical device including a lever pivoted to one of the shoes and formed to clear the stop for that shoe.

3. A brake comprising a drum, primary and secondary shoes, an anchor betwen the shoes at one side of the drum, articulating means connecting the shoes at the other side of the drum, an adjustable stop associated with each shoe and having a part engaging the drum when the brake is applied and which sets the stop to compensate for wear of the shoe, a strong spring yieldingly holding the secondary shoe against the anchor in a position determined by its stop, a weaker spring urging the primary shoe toward the anchor into a position determined by its stop, a mechanical device for forcing the shoes apart to apply the brake, and a device cushioning the movement of the primary shoe against the anchor in reverse braking and which is formed and arranged to be operable as a second brake applying device.

RUDOLPH A. GOEPFRICH.